United States Patent [19]

Meyers

[11] Patent Number: 5,133,848

[45] Date of Patent: Jul. 28, 1992

[54] ON-SITE OXIDANT GENERATOR

[75] Inventor: Donald E. Meyers, Virginia Beach, Va.

[73] Assignee: Oxi Generators, Inc., Virginia Beach, Va.

[21] Appl. No.: 740,095

[22] Filed: Aug. 5, 1991

[51] Int. Cl.⁵ .................... C25B 9/00; C25B 15/08; C25B 11/03; C25B 11/10

[52] U.S. Cl. .................... 204/228; 204/263; 204/284; 204/293; 204/290 F; 204/266

[58] Field of Search .................... 204/228, 263–266, 204/292, 284, 293, 290 F, 271, 252–258

[56] References Cited

U.S. PATENT DOCUMENTS

| | | | |
|---|---|---|---|
| 4,129,493 | 12/1978 | Tighe et al. | 204/228 |
| 4,724,059 | 2/1988 | Collier | 204/266 X |
| 4,786,391 | 11/1988 | Clemens | 204/266 |
| 4,976,842 | 12/1990 | Fowler | 204/271 X |
| 5,034,110 | 7/1991 | Gore et al. | 204/228 |
| 5,037,519 | 8/1991 | Wiscombe | 204/266 X |

Primary Examiner—Donald R. Valentine
Attorney, Agent, or Firm—Dennison, Meserole, Pollack & Scheiner

[57] ABSTRACT

A water treatment device which is of simple construction and operation, and which can provide sufficient oxidant gas to disinfect drinking water for about 3,000 people. The device includes an electrolysis unit, a water flow circuit with constant water flow and a venturi which aspirates the oxidant gas produced by the electrolysis unit. A timer turns the electrolysis unit on and off to maintain oxidant gas levels substantial constant in the water supply and a valve is provided which is operated by a timer unit to replace water in the anode compartment of the electrolysis unit. When the electrolysis unit is shut-off for maintenance, the venturi is used to aspirate liquid from the electrolysis unit, thus avoiding operator contact with caustic chemicals to the extent possible.

12 Claims, 2 Drawing Sheets

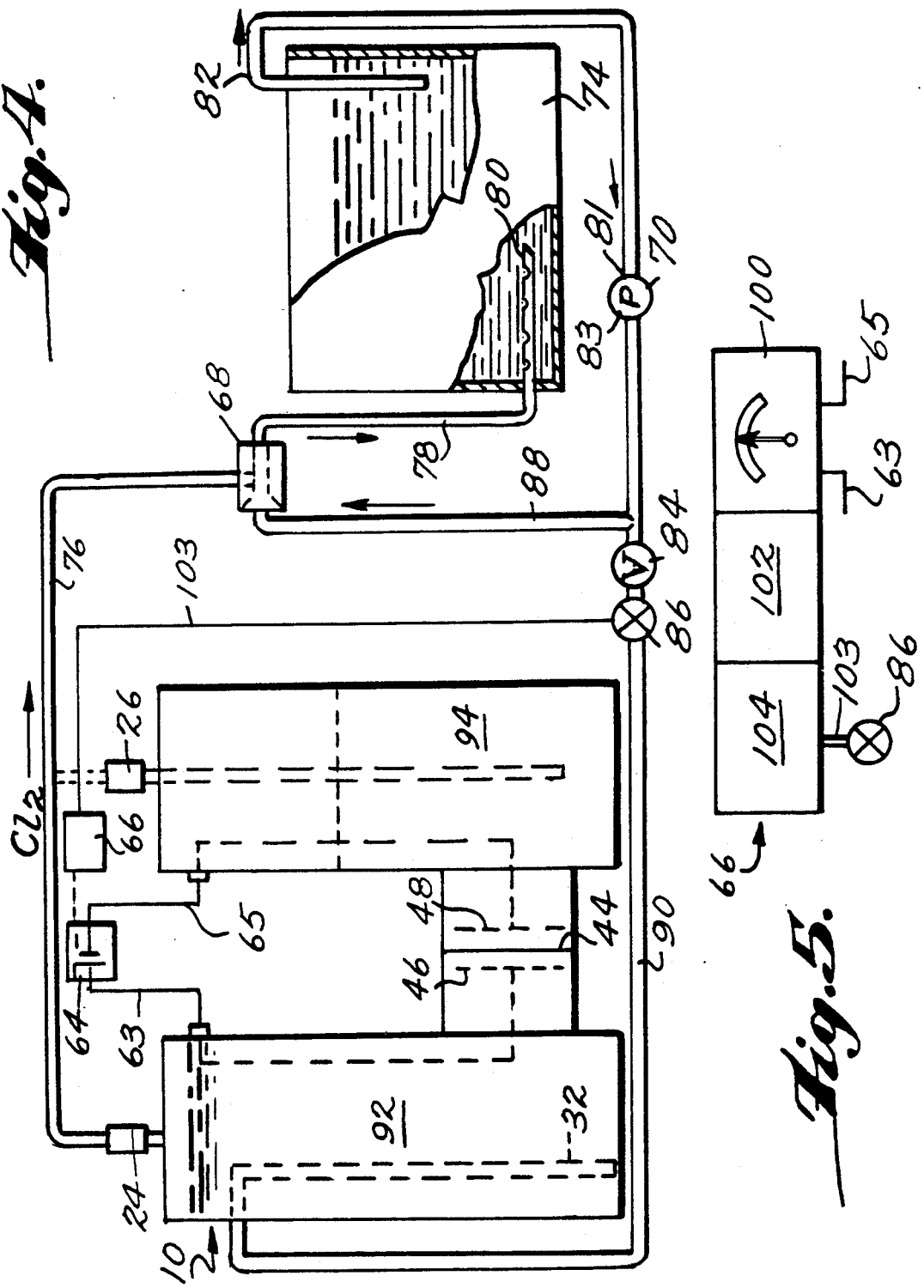

ON-SITE OXIDANT GENERATOR

BACKGROUND OF THE INVENTION

This invention relates to the field of water disinfection, and specifically to disinfection of drinking water in remote locations where conventional disinfecting apparatus and materials are not available.

Failure to properly disinfect water supplies is one of the most serious problems affecting the health of the residents of third world countries, in particular residents of small towns, rural areas and marginal urban areas. Disinfection of drinking water is a fundamental health measure, and whenever carried our reliably and adequately, it has assured the health of users of the water supply.

There are more than twenty diseases related to drinking water supply. Debilitating and in some cases deadly, the diseases impose a terrible economic and physical handicap on everyone involved, especially upon the poor who can least afford it. The most serious and frequent of these diseases, to a very large extent, can be prevented through adequate disinfection of water supplies.

Numerous studies have been performed over the past fifty years of the benefits of disinfection, but two of the most recent are particularly significant. One study, an eight year study by Bersch and Osorio, found an inverse relationship between the levels of residual chlorine in water supplies and the rates of diarrhea among children under five years of age. In another study, a 1981 pilot project compared 300 families in West Bengal, India that received disinfected drinking water with 300 families that did not. All of the factors were determined to be essentially the same. Over a nine month period, there was an 80% reduction in the incidents of diarrhea among children receiving the disinfected water as compared to only a 5% reduction among the other children.

In situations where water is the predominant vehicle for transmission of typhoid, paratyphoid, cholera, diarrhea, hepatitis and giardiasis, adequate levels of disinfection and adequate contact time will reduce the incidents of disease, so that the health benefits of more reliable, simpler and cheaper disinfection are obvious.

Although many conventional methods of disinfection are available throughout the world, over 75% of all disinfection facilities in third world countries have failed to provide continuous and adequate disinfection despite more than twenty years of effort to develop human resources, institutions, an supporting infrastructures. The commonly cited reasons for the failure of disinfection are:

1. Undependable or unavailable supply of chemicals;
2. Unavailability of spare parts;
3. Operational requirements too complex for local operators;
4. Repair of equipment too complex for local operators;
5. Inadequate infrastructure to support the purchase, transport and storage of chemicals, spare parts and supplies;
6. User dissatisfaction with widely varying chlorine levels;
7. Difficulties involved with local storage, handling, mixing and dosing of chemicals;
8. Limited durability of equipment;
9. Insufficient operator training and experience, as well as inadequate basic education; and
10. Inadequate safety considerations.

A number of alternate technologies employing ozonation, ultra violet light, halogenated resins, radiation, ionization, chlorine dioxide, chlordanes, and appropriate technologies for hypochlorination have been introduced to overcome the above problems, but these haven't circumvented the major causes of the failures. Some of the alleged cures have even added to the failures. Generally, the majority of advancements in disinfection have been aimed primarily in solving problems encountered in industrialized countries and have not been directed to solve the specific and different problems of disinfection in developing countries.

Disinfecting devices suitable for use in small towns and rural areas of developing countries should be simple to operate and maintain and avoid chemical and mathematical calculations which are beyond the capability of local operators. The equipment should also be durable and easy to repair and use readily available chemicals. Finally, the equipment should be useable over a wide range of physical and chemical conditions.

SUMMARY OF THE INVENTION

Thus, it is the object of the invention to provide an oxidant generator system which will eliminate as many of the causes of disinfection failure as possible, and which will be easy to operate and maintain, utilize readily available spare parts and locally available chemicals and which will be generally automatic in operation.

These and other objects can be achieved according to the invention by a water purification device comprising generally cylindrical, vertically disposed anode and cathode compartments having removable tops with withdrawal ports therein. The anode compartment also includes an inlet means connected to a tube extending a predetermined vertical distance toward the bottom of the anode compartment, while the cathode compartment has the withdrawal port connected to a tube means extending a predetermined vertical distance toward the bottom of the cathode compartment.

A generally cylindrical, horizontally disposed bridge means connects the anode and cathode compartments at a predetermined vertical distance from the removable tops, and an ion selective membrane located in the bridge means separates the anode and cathode compartments. Electrical anode and cathode means are located in their respective compartments adjacent the membrane.

The anode and cathode compartments and bridge means together comprise an electrolysis device for generating an oxidant gas for water purification when connected through a water flow circuit including a pump with inlet and outlet, an inflow tube connecting the inlet of the pump with a water storage means, an outflow tube connecting the outlet of the pump with water storage means, a venturi means located in the outflow tube between the pump and the diffusing device, a valve in a branch of the outflow tube between the pump and the venturi configured for selectively delivering a portion of the water in the water flow circuit to the anode compartment inlet. The venturi is connected by a tube to the withdrawal port of the anode compartment, and thereby removes gas from the anode compartment and injects the gas into the water flow circuit, and thus into the water storage means.

The device also includes a direct current power supply connected to the anode and cathode means and a timer controlling the operation of the power supply and the valve which controls water flow to the anode compartment inlet.

The apparatus as described can be easily constructed in the form of a unit to provide a relatively small amount of disinfectant gas for injection into a water distribution system. Oxidant output from such a unit will generally range from 0.01 to 0.5 kilograms of chlorine equivalent disinfectant for a 24- hour operating day. This is sufficient oxidant to disinfect enough drinking water for between 70 (0.01 kg) and 3000 (0.5 kg) people based on a chlorine demand of 1.5 mg/l and 90 l/day usage per person.

The apparatus can be operated using locally available salt as the primary chemical. The basic building block of the equipment is PVC piping components, and the power supply can be a modified, regulated, battery charging device. The unit is designed so that the operator does not have to handle or measure any dangerous chemicals and need only measure the disinfectant residual in the drinking water using a simple visual comparison chlorine test kit. Thus, substantially all the necessary components for such an apparatus are available worldwide.

BRIEF DESCRIPTION OF THE DRAWINGS

FIG. 4 is a schematic diagram showing the operation of the apparatus according to the invention; and FIG. 5 is a schematic diagram of a control box for operating the electrolytic cell and related components.

DESCRIPTION OF THE PREFERRED EMBODIMENTS

Figure 1:
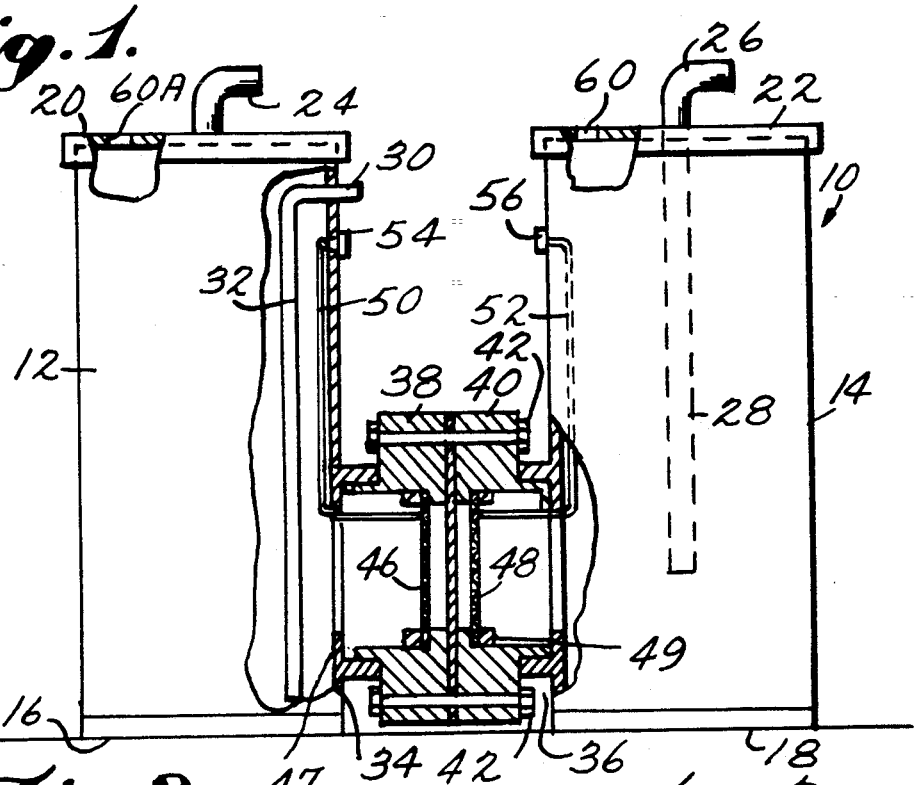
FIG. 1 is a side, cross-sectional view of an electrolytic cell used to produce oxidant gas in the apparatus of the invention.

The apparatus of the invention utilizes an electrolytic cell 10 shown in cross-section in FIG. 1. The cell comprises an anode compartment 12 and a cathode compartment 14, each made of a tee-section of PVC pipe. The anode compartment includes a permanently cemented bottom plug 16 and the cathode compartment includes a permanently cemented bottom plug 18. Each compartment also contains a removable top cap, 20 and 22, each including a permanently fixed withdrawal port 24 and 26. The external port 26 fixed in the top 22 of the cathode compartment is attached to a vertically extending tube 28, extending a predetermined distance into the cathode compartment. The anode compartment also includes an external port 30, shown in the side wall of the anode compartment, which is attached to a tube 32 which extends into the anode compartment close to the bottom of the compartment.

The anode and cathode compartments are joined at tee-sections 34 and 36 by a pair of flanges 38 and 40, bolted together by bolts 42. These flanges may be replaced by a threaded PVC pipe union.

The anode and cathode compartments are separated by an ion selective membrane 44 which is cemented between flanges 38 and 40 with a silicone material. Membrane 44 is a commercially available membrane which must be oriented so that the side marked C is directed toward the cathode.

The anode 46 and cathode 48 used are circular in design. The anode is made from specially coated titanium mesh material and is fixed permanently in the tee-section by solvent cementing a pipe 47 against flange 38. The anode 46 is fixed between pipe 47 and flange 38.

The cathode is formed of 300 series stainless steel material perforated to allow gases generated at the cathode to pass therethrough, and it is similarly permanently attached to the tee-section by a pipe 49 which is solvent cemented to the inside of the tee-section against flange 40. The distance between the cathode and the membrane is critical to the operation of the device, and this is permanently established during the assembly operation.

The anode has a titanium electrical lead 50 heliarc welded to it and this lead comes into the main body of the tee-section and out either through the lid or through a hole drilled in the upper part of the tee-section. A terminal 54 is located on the outside of the tee-section for connection to a power source. The cathode electrical lead 52 is similar to the anode lead except that it is made of 300 series stainless steel and it generally has at least twice the cross-sectional area of the titanium lead. This larger cross-sectional area is critical because it reduces the heat generated in the cathode lead and allows the unit to be operated without special cooling. The cathode lead is connected to a terminal 56 on the outside of the cathode tee-section.

Finally, the cathode and anode compartments each include a hole 60, 60A drilled in its cap, the hole permitting air to enter or escape as fluid enters or leaves the various compartments, and hydrogen generated in the cathode compartment to escape.

Figures 2, 3:
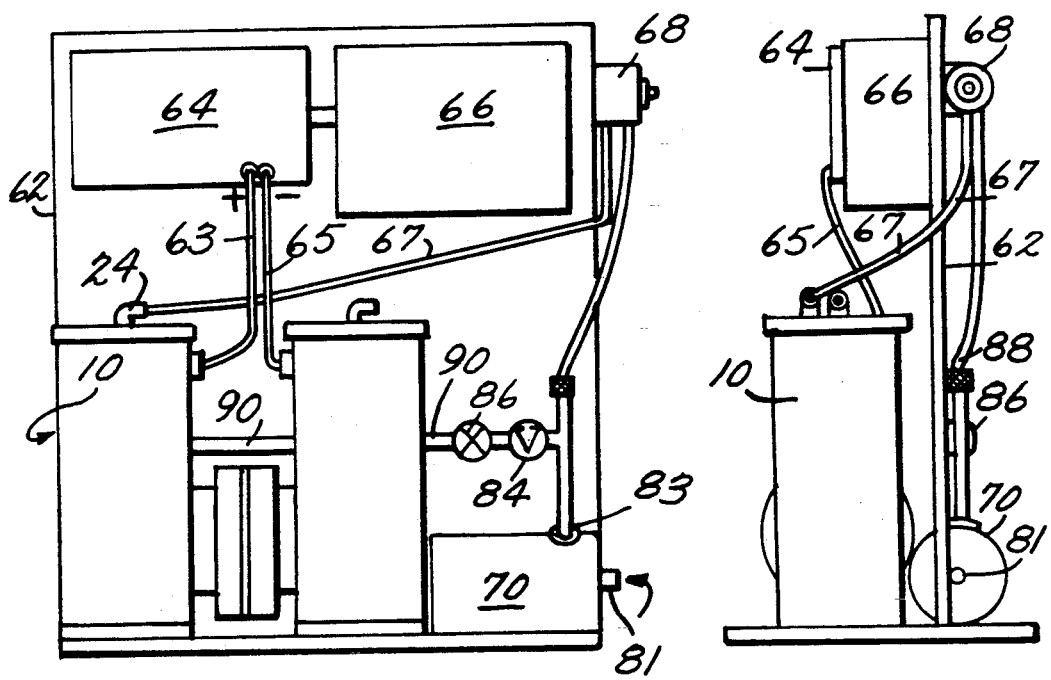
FIG. 2 is a side view of the electrolytic cell and associated components.
FIG. 3 is an end side view of the electrolytic cell and related components.

FIGS. 2 and 3 show the assembly of an apparatus according to the invention with various units bolted to a frame 62. The apparatus includes the above described electrolytic cell 10 and a power supply 64 connected to the electrolytic cell by cables 63 and 65. The DC power supply 64 will have an amperage output depending on the desired oxidant output of the unit. The power supplies used will range from 100 milliamps to 15 amps DC with an output voltage between 3 and 8 volts.

Preferably, a constant current DC power supply, with output current in the range of 0.1–15 amps, will be used, eliminating the need for the operator to adjust output current. Constant current DC power supplies are known, and are disclosed, for example, in U.S. Pat. Nos. 4,146,832 and 4,628,249.

In another particular embodiment, a constant-voltage DC power supply, such as a battery charger, may be modified by adding a triac current regulator which monitors the voltage drop across a current sampling shunt in series with the charger output. Increasing current through the shunt is fed back as increasing resistance in a variable resistor, such as a photocell, which "turns down" the triac and decreases the load current.

Operation of the power supply is controlled by a control box 66 and the output connector 24 of the anode compartment is connected by tubing 67 to a venturi 68. A pump 70 is also attached to the frame, the pump having an inlet 81 and an outlet 83, the outlet attached to venturi 68, through line 88. A branch 90 of line 88 is connected to a fixed flow balancing valve 84 which controls the water flow per unit time regardless of the line pressure. The use of this valve is important because the operator generally is not able to make this adjustment in the field, either not knowing the water pressure or being confronted with widely varying water pressure. The output of the balancing valve is directed through a solenoid operated valve 86, and when necessary, the valve 86 opens and a portion of the water flowing from the pump outlet is directed to the anode compartment through line 90. The operation of solenoid valve 86 is controlled by the control box 66 to which it is connected by cable 103.

The actual operating configuration of the device is shown in FIG. 4. The device is used to purify water contained in a tank 74 and to do so, a water circulation circuit is set up using an output line 82 connected to the input 81 of pump 70. The output 83 of pump 70 is connected through line 88 to venturi 68. Line 88 branches off into a parallel line 90 with flow balancing valve 84 and solenoid valve 86. Solenoid valve 86 is normally closed, and water flows through line 88 to the venturi.

Water flow through the circuit is completed by line 78 and distributor 80 connecting the venturi output to the bottom of the water-holding tank. The mixing input of the venturi is connected through line 76 to the fitting on top of the anode compartment, so that operation of the pump and water flow through the venturi creates a vacuum in line 76, drawing gas produced in the anode compartment.

To make the unit ready for operation, it is necessary to boil the membrane for 30 minutes and then cement the membrane to the flanges and bolt or screw the two compartments together. The anode compartment is then filled to the top with a locally available salt and filled with water 92 up to within 3 to 4 mm of the top of the cell.

The cathode compartment is filled with water 94 to the minimum catholyte level and flake or liquid sodium hydroxide is added to bring the specific gravity of the catholyte up to the range of 1.100. The specific gravity of the catholyte can be checked with a standard battery tester and needs to be at the top of the red range of the battery tester.

The unit is then ready for operation. The operator plugs the control box into 110 or 220 volts, and turns it on. Chlorine and other oxidant gases are generated in the anode compartment and the sodium from the salt of the anode compartment is attracted to the negatively charged cathode, passing through the ion selective membrane along with hydroxide ions, thus forming sodium hydroxide in the cathode compartment. As the unit produces oxidant gas from the chlorine in the salt, the sodium hydroxide in the cathode compartment increase in concentration and volume. The unit is designed so that the cathode compartment is filled with liquid caustic at the same time that salt in the anode department is depleted.

In order for the 0.1 kilogram and larger oxidant per day units to operate efficiently, it is necessary to add water to the anode compartment periodically to make the brine and to circulate the brine in the anode compartment of the cell. In order to properly circulate the brine, the water must be added from the bottom of the anode compartment. Accordingly, pipe 32 extends down near the bottom of the anode compartment. Solenoid valve 86, controlled by control box 66, opens automatically and directs a portion of water through tube 90 to the anode compartment in order to maintain the volume and circulate the brine. Flow balancing valve 86 closely controls the amount of water added to the anode compartment.

As shown in FIG. 5, control box 66 includes a 24-hour timer 100 which controls operation of the electrolytic cell by connection to terminals 54 and 56. Timer 100 controls the proportion of time that the electrolytic cell operates in any 24-hour period. The control box 66 also includes a second 24-hour timer 102, which collects and stores the amount of on-time of timer 100. Timer 102 controls a third timing device 104, which actuates the solenoid valve through cable 103, directing water to the anode compartment. Thus, regardless of how the operator sets timer 100, the proper amount of water is always directed to the anode compartment through operation of timers 102 and 104. Once the unit is put into operation, the time between recharging with salt is a function of the operating time of the unit. Salt needs to be added when the catholyte level rises to within three centimeters of the top of the cathode compartment, which is normally about every 100 operating hours. This is a simple visual way for the operator to know that service is required.

When service is required, the power supply to the electrolytic cell is turned off, while the pump is maintained in operation. The operator removes the venturi tube from the anode lid connection and places the end of the tube into the opening in the fitting of the cathode compartment lid, as shown in dotted lines in FIG. 4. The vacuum produced by the venturi causes the caustic solution in the cathode compartment to be aspirated into the water storage tank, which is desirable for pH control of the water produced. The liquid level in the cathode compartment will be reduced to the level of the bottom of the tee-section.

The cathode lid is then placed on the anode compartment, and the liquid in the anode compartment is aspirated utilizing the vacuum created by the venturi. The anode compartment is refilled with salt and water and the cathode compartment is filled with water to the minimum catholyte level, and the operating sequence is begun once again.

Utilizing this sequence and apparatus, an unskilled operator needs only to make an initial addition of caustic and a periodic addition of salt to the apparatus. Further handling of chemicals by the operator is not necessary since the venturi is used to transfer the liquids from both the anode and cathode compartments The timed water addition to the bottom of the anode compartment allows the unit to run unattended and ensures proper brine production and adequate mixing so that salt will be available for oxidant generation until the unit requires recharging. Mechanical mixing or agitating equipment is not necessary.

The use of the flow balancing valve in the water line eliminates the need for the operator to adjust water pressure which is critical to the cycle of the cell. The flow balancing valve eliminates the effects of changes in water flow rate and water pressure.

The anode and cathode compartments of the electrolysis cell are of such volume that the operator can visually determine when the cell needs maintenance. Since the amperage of the power supply will be fixed, the production of NaOH during any operating period can be calculated. The initial water level in the cathode compartment will thus be set so that exhaustion of the salt supply results in filling of the cathode compartment to within a few centimeters of the top.

The unit of the invention preferably operates with a constant current power supply. Oxidant output is controlled solely by controlling the length of time of operation of the electrolysis cell over the 24-hour period. In the setup phase of the unit, the operator turns on the unit and takes periodic measurements of the residual chlorine level in the water tank. When the chlorine level in the tank enters the proper range, i.e., 0.5-1.5 mg/l, the unit may be turned off and measurements taken of the residual chlorine level as it decreases When the residual chlorine level is below the safe point, i.e., 0.5 mg/l, the unit is turned on for a length of time necessary to increase the chlorine level to a safe concentration. The times involved will of course be dependent upon current output of the power supply and the volume of water in the treatment tank. Once the operating times have been established, the timer may be set for on periods and off periods in order to maintain the chlorine at the proper level.

A known amount of chlorine and caustic is generated over a 24-hour period. Since the initial level of liquid in the cathode compartment is known, and the rate of generation of caustic is known, the approximate operating time of the unit can be determined by determining the rate in rise of caustic in the cathode compartment.

EXAMPLE

A unit is designed to treat enough water for 1000 people, approximately 100,000 liters per day. To treat 100,000 liters of water requires sufficient chlorine to raise the chlorine level in the water to 1.5 mg/l, approximately 150 grams chlorine per day, plus an additional amount to compensate for the chlorine demand of the water being treated.

Theoretically, one ampere of current will generate $5.175 \times 10^{-6}$ moles of chlorine per second, or 0.447 moles chlorine per day, equal to 31.7 grams of chlorine per day. In order to generate enough chlorine to treat 100,000 liters of water per day, at least a 5 amp unit will be necessary, and in order to create some excess capacity to satisfy the chlorine demand, a larger unit is desirable.

The unit constructed for treatment is formed of two tee-sections of 4 inch diameter PVC pipe, each section 13.5 inches high, and the entire unit being approximately 17 inches across. The anode and cathode compartments each have a useful capacity of approximately 4 liters.

The unit utilizes a titanium mesh anode and a stainless steel mesh cathode, and the tee-sections are bolted together through the flanges. A Nafion® membrane (Dupont) is used.

A power supply capable of producing 3 to 8 volts DC at a relatively constant current of 15 amps is selected. This power supply is operated by a control unit including two 24-hour timers capable of 48 on/off settings per day and one Syrelec single shot timer capable of opening a valve for a settable time between 0.1 and 10 seconds in 0.2 second increments. The control unit also includes duplex receptacle and an on-off switch. The pump used is an Iwaki magnet pump sold by Walchem Corporation of Holliston, Mass., with a 1/16 horsepower motor, capable of moving 4.4 gallons per minute with a maximum head of 36 feet. Water flow to the anode compartment is limited by a Hays measured flow water flow control/balancing valve which reduces the water flow to 0.2 gallons per minute, and a Hays Midg-O-Matic solenoid valve which is normally closed and which opens when directed by the timer system.

The venturi used is an injector Model 384 from the Mazzei Injector Corporation.

In the start-up phase, the anode compartment is filled near the top with rock salt or flake salt and water is brought up to the level of the salt. The cathode compartment is filled with 10% NaOH solution having a specific gravity of about 1.1, in a quantity sufficient to completely immerse both the membrane and cathode, the level of solution rising approximately to the top of the bridge section. The electrolysis cell and pump are then turned on, causing oxidant gases to be generated and injected into the water flow. The operator of the unit takes periodic chlorine measurements of the water in the tank, and when the chlorine level reaches approximately 1.5 mg/l, the electrolysis unit is turned off. Then the time necessary for the chlorine to drop to the lower end of the safe range, approximately 0.5 mg/l, is noted and the unit is started up again and allowed to run until the chlorine reaches 1.5 mg/l. This gives the operator an indication of the on and off times necessary to maintain the chlorine at the proper level and allows the operator to set the on and off periods of the timer. Since the 15 amp power supply is capable of producing about 475 grams chlorine per day, and only 150 grams of chlorine are necessary to treat the water, the unit may run for only about 20 minutes per hour. The second timer collects the total on-time of the first timer and sends a signal to the single shot timer to open the solenoid valve in order to admit water to the anode compartment. In the electrolysis of brine, two moles of water are consumed for every mole of chlorine produced, meaning that in the course of a day, approximately 2.1 moles of chlorine are generated and 4.2 moles of water are used. While the operation of the solenoid valve will depend upon the exact operating conditions including the size of the flow lines, the valve may for example open for 5 seconds every hour in order to replenish water lost through electrolysis and evaporation.

The unit is allowed to operate until the liquid level in the cathode compartment rises to within about 4 centimeters of the top of the compartment. This typically takes about 100 hours, during which about 1 kilogram of sodium chloride is consumed. At this time, the power to the electrolysis unit is cut off, and the venturi tube is attached to the fitting on top of the cathode compartment so that catholyte solution may be aspirated from the compartment, generally reducing its level to the bottom of the bridge section, and added to the water supply. The lid of the cathode compartment is then placed on the anode compartment, and the venturi aspirates the remaining water from the anode compartment. The anode compartment is then filled with flake or rock salt and water as previously described.

Water is added to the cathode compartment to bring the liquid level to the top of the bridge section as previously described, and the specific gravity of the solution is checked. If the specific gravity is greater than 1.1, additional catholyte is removed from the cathode compartment and the remaining solution is further diluted. If the specific gravity is less than 1.1, further sodium hydroxide can be added, if desired, to the catholyte. In either case, the catholyte level is adjusted to the proper minimum level and the electrolysis cycle is begun once again.

What is claimed is:

1. A water purification device comprising:
   a generally cylindrical, vertically disposed, anode compartment, having a removable top with a withdrawal port therein, and an inlet means connected to a tube means extending a predetermined vertical distance within toward the bottom of said anode compartment;
   a generally cylindrical, vertically disposed cathode compartment with a removable top with a withdrawal port therein connected to tube means extending a predetermined vertical distance within toward the bottom of said cathode compartment;
   a generally cylindrical, horizontally disposed bridge means connecting said anode and cathode compartments at a predetermined vertical distance from said removable tops;
   ion selective membrane means located in said bridge means and separating said anode and cathode compartments;
   electrical anode means adjacent said membrane on the anode compartment side;
   electrical cathode means adjacent said membrane on the cathode compartment side;
   a water flow circuit including a pump with inlet and outlet, inflow tube means connecting the inlet of the pump with water storage means, an outflow tube means connected to the outlet of the pump with water storage means, a venturi means located in the outflow tube means between the pump and water storage means, valve means between said outflow tube means and said anode compartment inlet means for selectively delivering a controlled amount of water in said water flow circuit to said anode compartment inlet means;
   aspiration tube means connecting said venturi means to said anode compartment withdrawal port, adapted for removing gas from said anode compartment and injecting the gas with into the water flow circuit;
   a direct current power supply operatively connected to the anode and cathode means; and
   timer means controlling the operation of the power supply and valve in the outflow means.

2. A device according to claim 1, wherein said direct current power supply provides a substantially constant current.

3. A device according to claim 1, wherein said valve means comprises a valve which opens on demand to admit water to said anode compartment.

4. A device according to claim 3, wherein said valve is a solenoid valve.

5. A device according to claim 4, wherein said timer means comprises a first timer operatively connected to the power supply to turn the current to the anode means and cathode means on and off, a second timer for collecting and storing the on-time of the anode means and cathode means, and a third timer for supplying power to the solenoid valve.

6. A device according to claim 3, wherein said valve means additionally comprise a second valve having a substantially constant water flow output.

7. A device according to claim 1, wherein said electrical anode means comprises a titanium mesh.

8. A device according to claim 1, wherein said electrical cathode means comprises a stainless steel mesh.

9. A device according to claim 1, wherein said anode and cathode compartments are formed of tee-sections of polyvinyl chloride pipe.

10. A device according to claim 1, additionally comprising a water storage means with said inflow tube means and said outflow tube means therein.

11. A device according to claim 10, comprising a diffusing device at the end of said outflow tube means in said water storage means.

12. A device according to claim 1, wherein said aspiration tube means is selectively connectable to said cathode compartment withdrawal port, thereby to remove liquid from said compartment.

* * * * *